(12) United States Patent
Bennett (10) Patent No.: US 8,793,749 B2
(45) Date of Patent: Jul. 29, 2014

(54) SOURCE FRAME ADAPTATION AND MATCHING OPTIMALLY TO SUIT A RECIPIENT VIDEO DEVICE

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 1190 days.

(21) Appl. No.: 12/197,781

(22) Filed: Aug. 25, 2008

(65) Prior Publication Data

US 2010/0050225 A1    Feb. 25, 2010

(51) Int. Cl.
*H04N 7/173* (2011.01)
(52) U.S. Cl.
USPC ............... 725/93; 725/90; 725/91; 725/95; 725/96; 725/116
(58) Field of Classification Search
None
See application file for complete search history.

(56) References Cited

U.S. PATENT DOCUMENTS

| | | | | |
|---|---|---|---|---|
| 7,360,000 | B2 * | 4/2008 | Takita et al. | 710/72 |
| 7,653,251 | B2 * | 1/2010 | Dei et al. | 382/232 |
| 2005/0114445 | A1 * | 5/2005 | Tracton et al. | 709/203 |
| 2005/0132264 | A1 * | 6/2005 | Joshi et al. | 715/500.1 |
| 2006/0095944 | A1 | 5/2006 | Demircin et al. | |
| 2008/0034396 | A1 * | 2/2008 | Lev | 725/118 |
| 2008/0104652 | A1 * | 5/2008 | Swenson et al. | 725/118 |
| 2008/0178244 | A1 * | 7/2008 | Ayres et al. | 725/116 |
| 2008/0310496 | A1 * | 12/2008 | Fang et al. | 375/240.01 |
| 2009/0288129 | A1 * | 11/2009 | Wolfe et al. | 725/116 |
| 2009/0316778 | A1 * | 12/2009 | Kim et al. | 375/240.01 |

FOREIGN PATENT DOCUMENTS

WO    2009084896 A2    7/2009

OTHER PUBLICATIONS

European Patent Office; EP Search Report; EP Application No. 12003862.5; Sep. 28, 2012; 3 pgs.

* cited by examiner

*Primary Examiner* — Nasser Goodarzi
*Assistant Examiner* — Fred Peng
(74) *Attorney, Agent, or Firm* — Garlick & Markison; Edward J. Marshall

(57) ABSTRACT

A digital electronic device supports program transmission to a recipient device via the Internet. A frame adapter decodes incoming IP program packets and re-encodes resulting program signals adaptively to optimally suit the recipient device based upon configuration data of the recipient device. The frame adapter receives feedback from the recipient device, which may include a characterization of a communication path between the digital electronic device and the recipient device. The frame adapter utilizes the configuration information to generate the optimal video frame stream that is transmitted to the recipient device. The compression itself involves producing optimal number of base and predicted video frames. The adaptive encoder and multiplexer receives digitized program signals either from a local source or from an external program source, transcodes (optionally), encodes and multiplexes them adaptively to optimally suit individual recipient devices, based on configurations of the corresponding recipient devices.

19 Claims, 9 Drawing Sheets

SOURCE FRAME ADAPTATION AND MATCHING OPTIMALLY TO SUIT A RECIPIENT VIDEO DEVICE

BACKGROUND

1. Technical Field

The present invention relates generally to video transmission; and, more particularly, to program transmission to a recipient device via one or more communication networks.

2. Related Art

In recent years, other than merely providing broadband Internet services, Internet Service Providers (ISPs) have begun to think of more commercial opportunities in their Internet infrastructure investment. These commercial opportunities include streaming, downloading or buffer streaming audio and video content to recipient computers using via communication paths that often include the Internet infrastructure. Transfer of audio and video information using the Internet infrastructure involves compression encoding (hereinafter referred to as compression, encoding, or compression encoding) raw digital audio and video content and then packetizing the encoded audio/video at a source before transmission. The recipient computer de-packetizes and decodes the received data before presenting the resultant audio/video to a user. Audio and video may also be delivered to recipient video devices other than personal or laptop computers, such as televisions, personal digital assistants, mobile phones, pocket televisions, and personal video recorders, etc. via Internet channels. A typical term used to describe these commercial applications is Internet Protocol Tele-Vision (IPTV).

IPTV applications involve compression encoding and packetizing of the digital audio, video and data content at their sources prior to transmission. Sources of programming include commercial television broadcast programs, locally stored commercial and non-commercial music, locally stored recorded television programs, and movies, among other programming. The recipient device, such as an IPTV Set Top Box (IPTV STB), receives IP packets, de-packetizes the IP packets, decodes the encoded audio/video carried therein to raw audio/video, processes the raw audio/video to produce output video, and delivers the output audio/video to one or more recipient devices for presentation.

Encoding/decoding technologies currently available for audio/video encoding/decoding include standardized operations such as MPEG, JPEG, H.264, and MP3, for example. Such video encoding processes produce a sequence of encoded video frames. The sequence of video frames produced in the encoding process are packaged into data packets and transmitted to a recipient device. Some video encoding processes include generating, from raw video data, a spatially compressed independent frame, followed by spatially compressed reference (predictive) frames that only carry the difference video information between the independent frame and/or some of the preceding reference frames and current frame, and re-referencing (bidirectional predicted) frame that may only carry the difference video information between the independent frame and/or preceding and/or succeeding reference frames and current frame. This process is called time (temporal) compression/encoding. For example, with the MPEG4 compression standard, independent frames, referencing frames and re-referencing frames are referred to respectively as I, B and P frames.

Conventional compression techniques are used to save storage bandwidth. When transmitting such conventionally compressed media, any spatial compression error that occurs in an Independent frame may persist in subsequent reference and re-reference frames. In addition, IPTV STBs may not be able to recover/reconstruct an independent frame or a re-reference frame, if some packets carrying the frame(s) that are lost in the Internet channels. Also, since, at the source end, typically, compression employed is based upon a highest presumed quality of recipient devices (such as High Definition Tele-Visions—HDTVs—or surround sound audio systems). Thus, even though compression operations reduce the size of the data transmitted, huge amounts of Internet channel resources may be utilized even when a recipient device is incapable of benefiting from the high quality audio/video content. Another problem relating to the default transmission of highest quality video is that the recipient device needs huge buffering resources and extensive processing resources when operating upon the received video and audio information. These storage and processing demands placed upon the recipient device are required even though the recipient device may have its own storage, processing, and display limitations.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
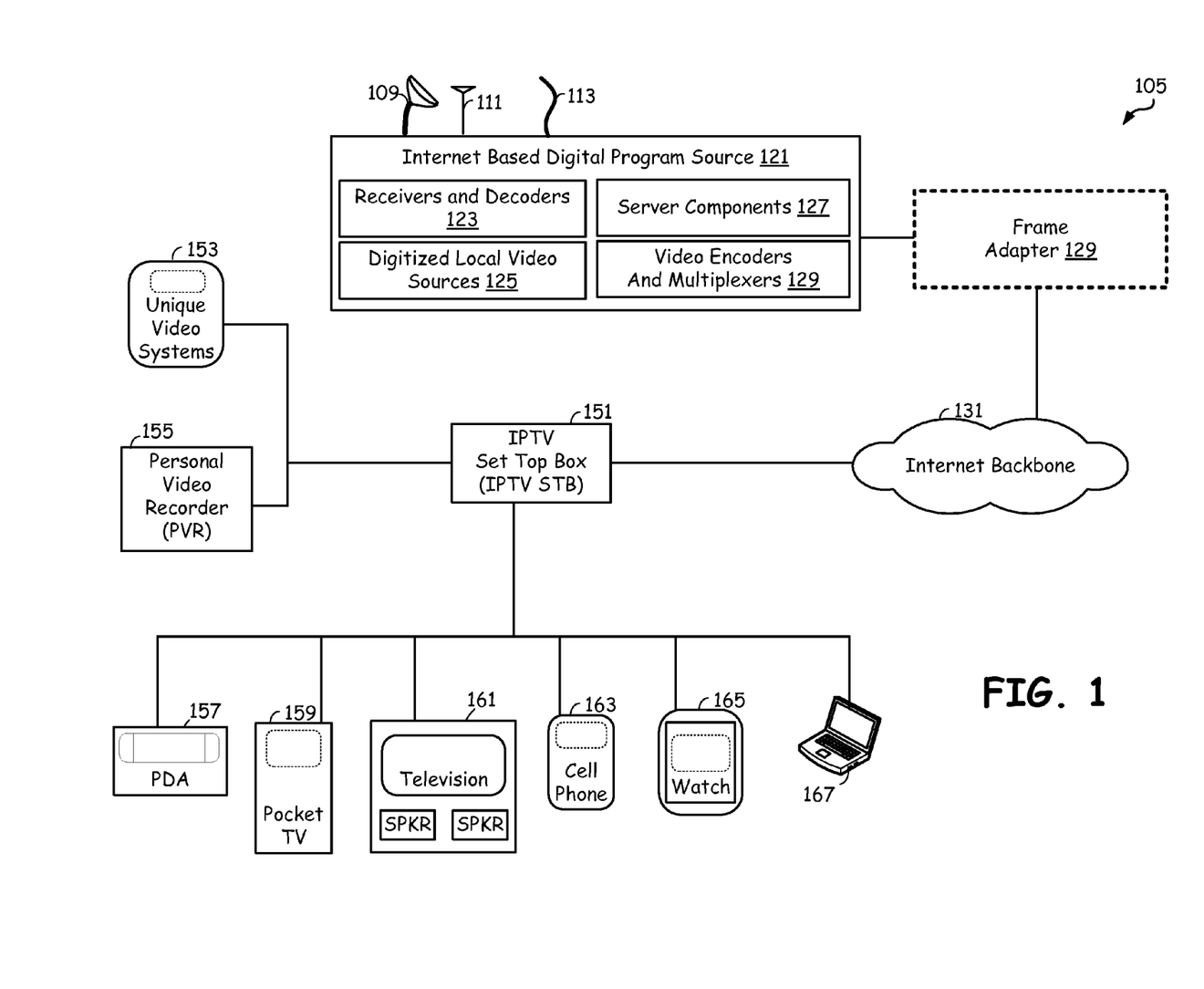
FIG. 1 is a schematic block diagram illustrating an Internet infrastructure containing an Internet based digital program source, a frame adapter incorporated at the front end of the Internet based digital program source and a plurality of recipient devices, wherein the frame adapter, in accordance with the present invention, decodes the incoming IP program packets, and re-encodes the resulting program signals adaptively to optimally suit the individual recipient devices, based upon configurations of the corresponding recipient devices.

FIG. 1 is a schematic block diagram illustrating an Internet infrastructure 105 containing an Internet based digital program source 121, a frame adapter 129 incorporated at the front end of the Internet based digital program source 121 and a plurality of recipient devices 153, 155, 157, 159, 161, 163, 165 and 167, wherein the frame adapter 129, in accordance with the present invention, decodes the incoming IP (Internet Protocol) program packets, and re-encodes the resulting program signals adaptively to optimally suit the individual recipient devices 153, 155, 157, 159, 161, 163, 165 or 167, based upon configurations of the corresponding recipient devices 153, 155, 157, 159, 161, 163, 165 or 167. Specifically, the frame adapter 129 receives IP program packets (such as IPTV—Internet Protocol Tele-Vision—packets that are commonly employed by the ISPs—Internet Service Providers—to deliver television, video, music programs on order, etc.). Then, the frame adapter 129 de-multiplexes audio, video and data signals and de-packetizes them, and then individually decompress the audio, video and data signals (the compression technology may vary, for example, MPEG4 compression technology may be employed on video signals, where as MP3 compression technology may be employed on audio signals). Once the raw audio, video and data signals are extracted, the frame adapter 129 receives feedback control signals containing recipient device specific 153, 155, 157, 159, 161, 163, 165 or 167 configuration data (such as screen size—aspect ratio—and required video data transfer rate, mono, stereo or surround sound audio configurations and required audio data transfer rate etc.) and compresses the raw audio, video and data signals optimally or adaptively to suit the requirements of the individual recipient devices 153, 155, 157, 159, 161, 163, 165 or 167. Then, the frame adapter 129 re-packetizes the optimally and adaptively compressed audio, video and data packets and multiplexes them and delivers them to the individual recipient device such as 153, 155, 157, 159, 161, 163, 165 or 167. A Set Top Box (STB) 151, if provided by the ISP(s) and if not incorporated into the recipient device 153, 155, 157, 159, 161, 163, 165 or 167 already, receives these IP program packets and decodes them by de-multiplexing, de-packetizing, decompressing and converting back to their original analog audio, video and data signals (and if need be, modulating on a RF—Radio Frequency—carrier) and deliver them to the recipient device 153, 155, 157, 159, 161, 163, 165 or 167 such as a television 161, for example. In another embodiment, some of the components of the frame adapter 129 such as an adaptive encoder and multiplexers 229 (refer to the description of FIG. 2 for more details) are directly employed into the Internet based digital program source 121, by modifying the existing Internet based digital program source 121.

The video compression technology used by the frame adapter 129 may take any of the available standards of compression such as MPEG-4. Typically, in these compression technologies, a base or independent frame is generated first (I-frame). The base or independent frame may also employ spatial compression for additional bandwidth reduction requirements. Once a base frame is generated, the rest of the temporal compression frames (predicted or bidirectional predicted frames, i.e., P-Frame, B-Frame) within a frame set are generated. The frame adapter 129 generates optimally or adaptively independent frames and predicted frames (based upon differences between current frame and the base frame or previous reference frames) within the frame set based upon feedback control data (recipient device 153, 155, 157, 159, 161, 163, 165 or 167 configuration data). The manner in which the frame adapter 129 produces I, P, and B frames may differ from standardized frame generation techniques, e.g., differ from the MPEG-4 standard, to accommodate recipient device characteristics and to accommodate transmission path limitations/characteristics.

For example, for a recipient device 153, 155, 157, 159, 161, 163, 165, or 167, such as pocket television 159 with a small screen, the number of reference frames may be very few on a percentage basis, e.g., higher percentage of base frames in frame sequence that is delivered. This avoids possible error persistence because of errors in the base frame or first few frames and also, reduces the buffering and processing requirements of the recipient device 153, 155, 157, 159, 161, 163, 165 or 167 in consideration. Typically, the larger the frame set, the higher the processing power and buffering capability required by the recipient device 153, 155, 157, 159, 161, 163, 165 or 167. Resultantly, delay in live broadcast program reproduction results and any errors occurring in the decoding process will persist longer. In addition, if any packets are lost in transmission, the recipient device 153, 155, 157, 159, 161, 163, 165, or 167 may not be able to recover the video image from successfully received base and predicted frames. In addition, for many small screen devices, re-reference frames may not be generated at all and in some other cases only few re-reference frames may be created. The audio compression, on the contrary, may use available compression technologies such as MP3, which is also adapted optimally to suit the recipient device 153, 155, 157, 159, 161, 163, 165 or 167 audio configurations such as audio bandwidth reproduction capabilities as well as mono, stereo or surround sound capabilities.

The STB 151 (or the recipient devices 153, 155, 157, 159, 161, 163, 165 and 167 themselves if decoding modules are incorporated into them) download and store decoding algorithms (that is, decompression and de-packetization algorithms) and other firmware from the Internet based digital program source 121 directly, when needed. Decompression algorithms may vary depending on the compression technology and adaptive compression technology used by the frame adapter 129, in response to the feedback control data from the STB 151 or recipient devices 153, 155, 157, 159, 161, 163, 165 and 167. Therefore, it may be necessary to download appropriate decompression algorithms from the Internet based digital program source 121 when needed. Either the STB 151, recipient devices 153, 155, 157, 159, 161, 163, 165 and 167, frame adapter 129, or the Internet based digital program source 121 may initiate this process of upgrading decompression algorithms or other firmware, depending upon a pre-programmed logic. Typically, the upgrading may only be done once when the recipient device 153, 155, 157, 159, 161, 163, 165 and 167 configurations are uploaded to the frame adapter 129, and in this case, the frame adapter 129 may initiate the downloading of decompression algorithms. The illustration 105 depicts various components of the Internet based digital program source 121 that include receivers and decoders 123, digitized local video sources 125, server components 127 and encoders and multiplexers 129.

The illustration 105 also depicts some of the typical modern recipient devices such as unique video systems 153 (which may include video devices such as projector), personal video recorder 155, PDA (Personal Digital Assistant) 157, pocket television 159, television 161, cell phone 163, watch 165 (with video screening capability built into them) and personal or laptop computer 167, communicatively coupled to the Internet based digital program source 121 via STB 151, Internet backbone 131 and frame adapter 129. The recipient devices 153, 155, 157, 159, 161, 163, 165, and/or 167, in other embodiments, couple to the Internet backbone 131 and interact with the frame adapter 129 without interaction of the IPTV STB 151.

Each of the recipient device 153, 155, 157, 159, 161, 163, 165 or 167 has its own optimal audio, video and data presentation capabilities (called here as the feedback control data or configuration data). The frame adapter 129 may be located at the premises of the ISP, where the Internet based digital program source 121 is also located. In addition, the Internet based digital program source 121 may also contain a satellite dish 109, an antenna 111 (to receive locally broadcast programs, for example) and cable or fiber optic connections 113, to communicate with external program sources.

For example, a pocket television 159 may have an associated STB 151 that broadcasts the received programs wirelessly within the perimeter of a house. When user sets up the pocket TV 159 and STB 151, the frame adapter 129 receives STB 151 and pocket TV 159 configuration data sent by the STB 151 and/or pocket TV 159, which are initiated by the STB 151 and pocket TV 159 themselves. As a result, the frame adapter 129 determines the compression technology to be used along with adaptive compression parameters involved, and then sends request to the Internet based digital program source 121 to upgrade the STB 151 with appropriate decompression algorithm and other firmware. Once decompression algorithm and firmware are upgraded, the frame adapter 129 decodes packets coming from the Internet based digital program source 121 and then re-encodes them adaptively to optimally meet the requirements of the pocket TV 159. The pocket TV 159 may have small black and white or color screen with configuration requirements of 156 kbps data. In addition, the pocket TV 159 may have monaural audio requirements of 4 KHz bandwidth. The frame adapter 129 accordingly delivers adaptively re-encoded packets to the STB 151 to meet these requirements.

Figure 2:
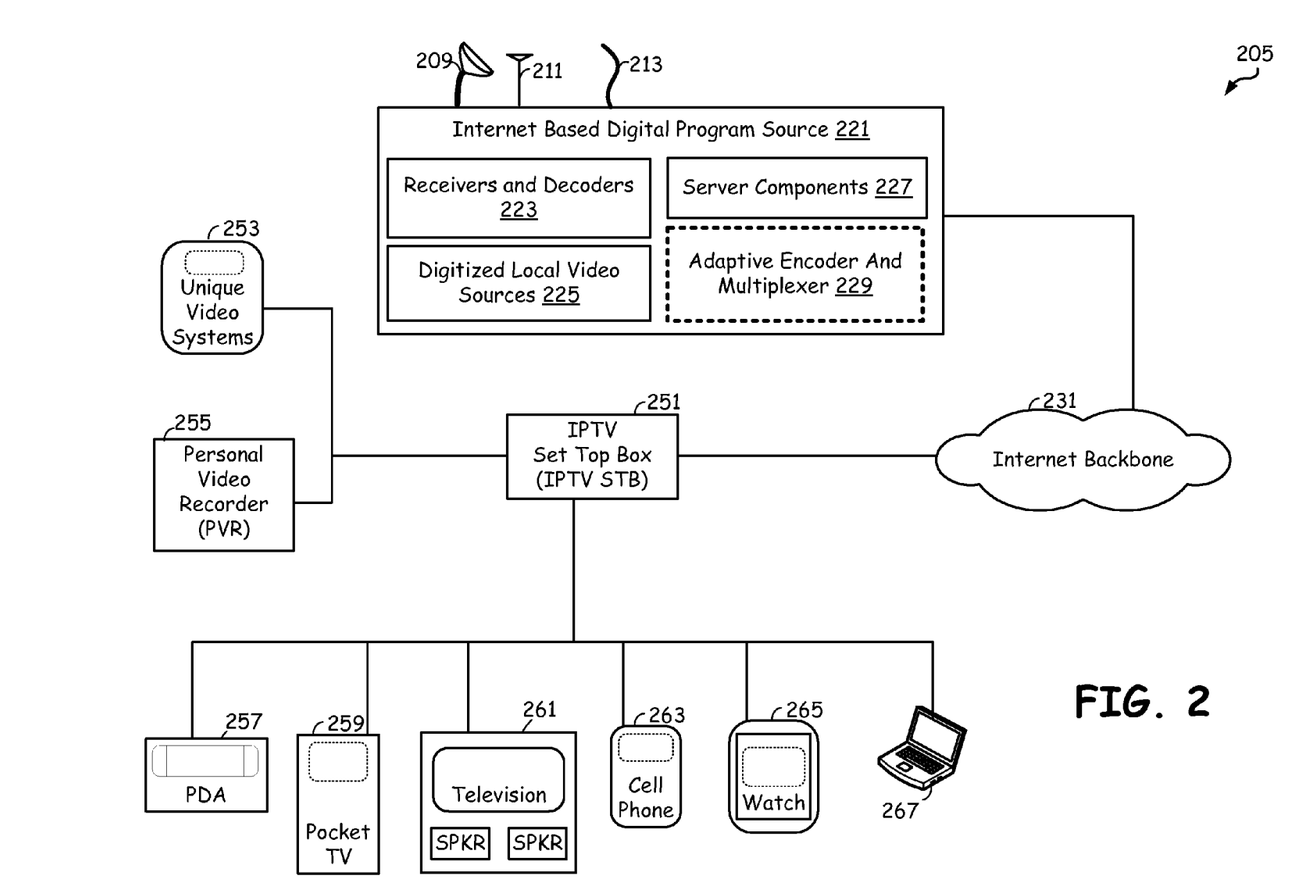
FIG. 2 is a schematic block diagram illustrating an Internet infrastructure containing an Internet based digital program source with a (modified) adaptive encoder and multiplexer built therein and a plurality of recipient devices, wherein the adaptive encoder and multiplexer, in accordance with the present invention, receives digitized program signals either from a local source or from an external program source, transcodes (optionally), encodes and multiplexes them adaptively to optimally suit the individual recipient devices, based on configurations of the corresponding recipient devices.

FIG. 2 is a schematic block diagram illustrating an Internet infrastructure 205 containing an Internet based digital program source 221 with a (modified) adaptive encoder and multiplexer 229 built therein and a plurality of recipient devices 253, 255, 257, 259, 261, 263, 265 and 267, wherein the adaptive encoder and multiplexer 229, in accordance with the present invention, receives digitized program signals either from a local source 225 or from an external program source, transcodes (optionally), encodes and multiplexes them adaptively to optimally suit the individual recipient devices 253, 255, 257, 259, 261, 263, 265 and 267, based on configurations of the corresponding recipient devices 253, 255, 257, 259, 261, 263, 265 and 267. This illustration 205 depicts two more embodiments of the present invention, involving adaptive encoder and multiplexing circuitry 229, with or without a transcoder, built into the Internet based digital program source 221.

The video compression employed by the adaptive encoder and multiplexing circuitry 229 may take any of the available standards of compression such as MPEG4. The compression technology employed utilizes removal of redundant video information to save transmission bandwidth or storage area. Two types of technology used currently and that may be used in conjunction with embodiments of the present invention include spatial compression and temporal compression, both of which may be simultaneously employed. Spatial compression eliminates redundant information within a given frame, while temporal compression eliminates redundant information across many frames, to form a frame set.

Typically the compression begins with a base or independent frame generated first, within any given frame set, which employs only spatial compression for bandwidth or storage area reduction requirements. Once a base frame is generated, the rest of the temporal compression frames (predicted or bidirectional predicted frames), within a frame set, are generated. The adaptive encoder and multiplexing circuitry 229 generates optimally or adaptively remainder of the reference frames (based upon differences between current frame and the base frame or previous reference frames) within the frame set based upon feedback control data (recipient device 253, 255, 257, 259, 261, 263, 265 or 267 configuration data). The parameters of adaptive temporal compression include numbers of reference frames and re-reference frames generated within a frame set, which in turn depend on the processing and buffering capability of the recipient devices 253, 255, 257, 259, 261, 263, 265, and 267.

The illustration 205 depicts recipient devices such as unique video systems 253, personal video recorder 255, PDA (Personal Digital Assistant) 257, pocket television 259, television 261, cell phone 263, watch 265 (with video screening capability built into them) and personal or laptop computer 267, communicatively coupled to the Internet based digital program source 221 via STB 251 and Internet backbone 231. Each of the recipient device 253, 255, 257, 259, 261, 263, 265 or 267 has its own optimal audio, video and data presentation capabilities (called here as the feedback control data or configuration data). Of course, multiple recipient devices may share their optimal settings.

The STB 251 (or the recipient devices 253, 255, 257, 259, 261, 263, 265 and 267 themselves if decoding modules are incorporated into them) has the capability to download and install necessary firmware (that includes decompression and de-packetization algorithms) from the Internet based digital program source 221 directly, when needed. The firmware depends upon the adaptive compression technology used by the adaptive encoder and multiplexer 229 at the Internet based digital program source 221. The illustration 205 depicts various other components of the Internet based digital program source 221 that include receivers and decoders 223, digitized local video sources 225 and server components 227. The Internet based digital program source 221 contains many communication tools to support the receipt and execution of external programs from their source via as a satellite dish 209, an antenna 211 and cable or fiber optic connections 213.

The adaptive encoder and multiplexing circuitry 229 receives raw audio, video and data signals from digitized local video source 225 or receivers and decoders 223 (that is, from an external program source). The adaptive encoder and multiplexing circuitry 229 contains a feedback controller unit (not shown here) that receives feedback control data containing recipient device specific 253, 255, 257, 259, 261, 263, 265 or 267 configuration data (such as screen size—aspect ratio—and required video data transfer rate, mono, stereo or surround sound audio configurations and required audio data transfer rate etc.). This information is necessary for the adaptive encoder and multiplexing circuitry 229 to adaptively encode the raw audio, video and data signals.

Then, the adaptive encoder and multiplexing circuitry 229 compresses the raw audio, video and data signals optimally or adaptively to suit the requirements (which include screen aspect ratio, audio capabilities such as mono, stereo or surround sound reproduction, processing power and buffering capability) of the individual recipient devices 253, 255, 257, 259, 261, 263, 265 or 267. In another embodiment of the present invention, the adaptive encoder and multiplexing circuitry 229 may transcode the raw audio, video and data signals to optimally suit the requirements of the recipient device 253, 255, 257, 259, 261, 263, 265 or 267. This, in addition to compression, reduces the required bandwidth for transmission as well as the processing and buffering capability requirements of the recipient device 253, 255, 257, 259, 261, 263, 265 or 267. Then, the adaptive encoder and multiplexing circuitry 229 re-packetizes the optimally and adaptively transcoded and compressed audio, video and data packets and multiplexes them and deliver them to the individual recipient device such as 253, 255, 257, 259, 261, 263, 265 or 267. A STB 251 (the functionality of the STB 251 may also be directly incorporated into the recipient device 253, 255, 257, 259, 261, 263, 265 or 267) receives these IP program packets and decodes them by de-multiplexing, de-packetizing, decompressing and converting back to their original analog audio, video and data signals (and if need be, modulated upon a RF—Radio Frequency—carrier and deliver them to the recipient device 253, 255, 257, 259, 261, 263, 265 or 267.

For example, a television 261 may have an associated STB 251 that receives IP program packets from the Internet based digital program source 221. Initially, the STB 251 receives appropriate firmware containing decompression algorithm from the Internet based digital program source 221. The adaptive encoder and multiplexing circuitry 229 delivers adaptively and optimally encoded IP program packets. The television 261 may have capability of a HDTV quality signal display, surround sound capability, higher processing and buffering capability. Therefore, the adaptive encoder and multiplexing circuitry 229 optimally encodes signals to a HDTV screen aspect ratio, surround sound quality, higher processing and buffering capability, by increasing the number of reference and re-reference frames in a frame set size.

In adapting an audio/video frame stream based upon channel characteristics, the adaptive encoder and multiplexer 229 first characterizes a transmission path between the Internet based digital program source 221 and one or more of the recipient devices 253, 255, 257, 259, 261, 263, 265 and 267. This characterization may include average bandwidth, instantaneous bandwidth, bit error rate, average latency, and instantaneous latency of a transmission path between the Internet based digital program source 221 and a recipient device. The adaptive encoder and multiplexer 229 then adapts the audio/video frame stream in response to this channel characterization. Adaptation for a channel having a high bit error rate (loss rate) may include re-encoding the audio/video frame stream to include a greater number of base frames than is required by an operating standard being mostly followed. Further, such adaptation may include altering the frame rate consistently with the channel characteristics, e.g., reducing frame rate for low bandwidth channel, keeping/increasing frame rate for channel having a relatively high bandwidth.

Figure 3:
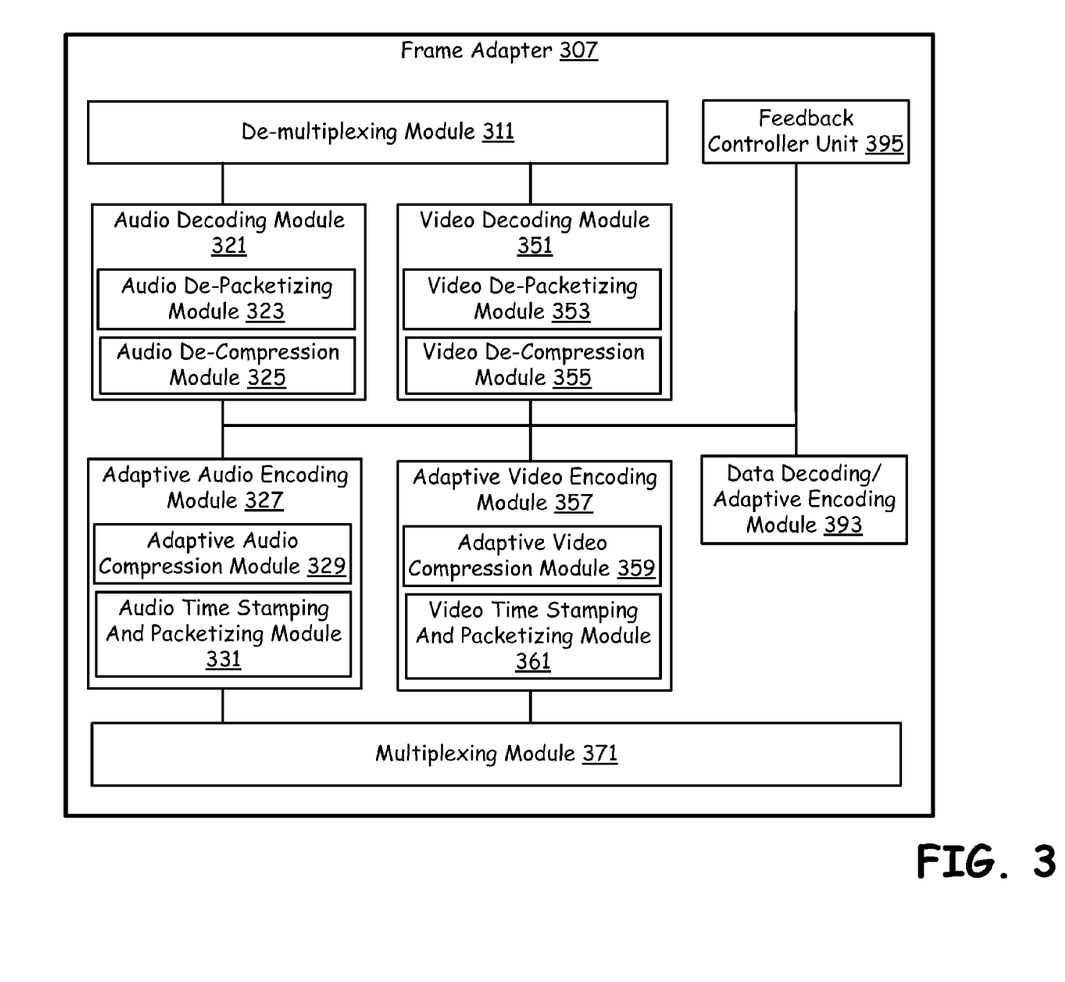
FIG. 3 is a schematic block diagram illustrating components of a frame adapter constructed in accordance with the embodiment of FIG. 1 of the present invention.

FIG. 3 is a schematic block diagram illustrating components of a frame adapter 307 constructed in accordance with the embodiment of FIG. 1 of the present invention. The frame adapter 307 is incorporated into the front end of the Internet based digital program source (121 of FIG. 1) and contains a plurality of modules to de-multiplex, decode and re-encode audio, video and data signals embedded in the IP program packets received from the Internet based digital program source.

The plurality of modules of the receiving end of the frame adapter 307 include a de-multiplexing module 311. The de-multiplexing module 311 separates audio, video and data IP program packets from the incoming IP program signals and delivers them to corresponding audio decoding module 321, video decoding module 351 and data decoding/adaptive encoding module 393.

The audio decoding module 321 contains audio de-packetizing module 323 and audio decompression module 325. The audio de-packetizing module 323 removes IP protocol information from the audio IP packets, extracts and delivers compressed audio signals, in a format in which they were originally compressed (for example, using MP3 compression format), to the audio decompression module 325. The audio decompression module 325 decompresses the incoming compressed audio signals and extracts the raw audio signal in a standard format.

The raw audio signal is delivered to an adaptive audio encoding module 327, which in turn contains an adaptive audio compression module 329 and audio time stamping and packetizing module 331. The adaptive audio compression module 329 compresses the raw audio signal in an optimal and adaptive manner. The feedback control data for determining optimum and adaptive compression is obtained from a feedback control unit 395. Then, the audio time stamping and packetizing module 331 inserts IP protocol information and time stamp on the incoming compressed audio stream to convert the compressed audio signals to IP audio program packets and deliver them to a multiplexing module 371.

Similarly, the video decoding module 351 contains video de-packetizing module 353 and video decompression module 355, which in turn remove IP protocol information from the audio IP packets and extract compressed video signals (in a format in which they were originally compressed, for example, using MPEG4 compression format), and then decompress to extract the raw video signal in a standard format, respectively. The adaptive video compression module 359 and video time stamping and packetizing module 361 contained in adaptive video encoding module 357, respectively, compress the raw video signal in an optimal and adaptive manner and then insert IP protocol information and time stamp on the incoming compressed video stream to convert the compressed video signals to IP video program packets and deliver them to the multiplexing module 371. The feedback control data for determining an optimum number of base, referencing, and re-referencing frames within a frame set and the sequence that is produced (that is, adaptive and optimal compression) is obtained from the feedback control unit 395. The data decoding/adaptive encoding module 393 decodes and then adaptively encodes the data stream in an analogous fashion to that of audio and video decoding and adaptive encoding process, based upon feedback control data from the feedback control unit 395.

If the received IP program packets contain a plurality of video programs (such as a plurality television channels delivered simultaneously), then the de-multiplexing module 311 de-multiplexes the plurality of video programs to separate each video program and then de-multiplex the audio, video and data signals of each video program independently. Similarly, the multiplexing module 371 also multiplexes the plurality of video programs, in addition to multiplexing audio, video and data IP program packets within each of these video programs.

Figure 4:
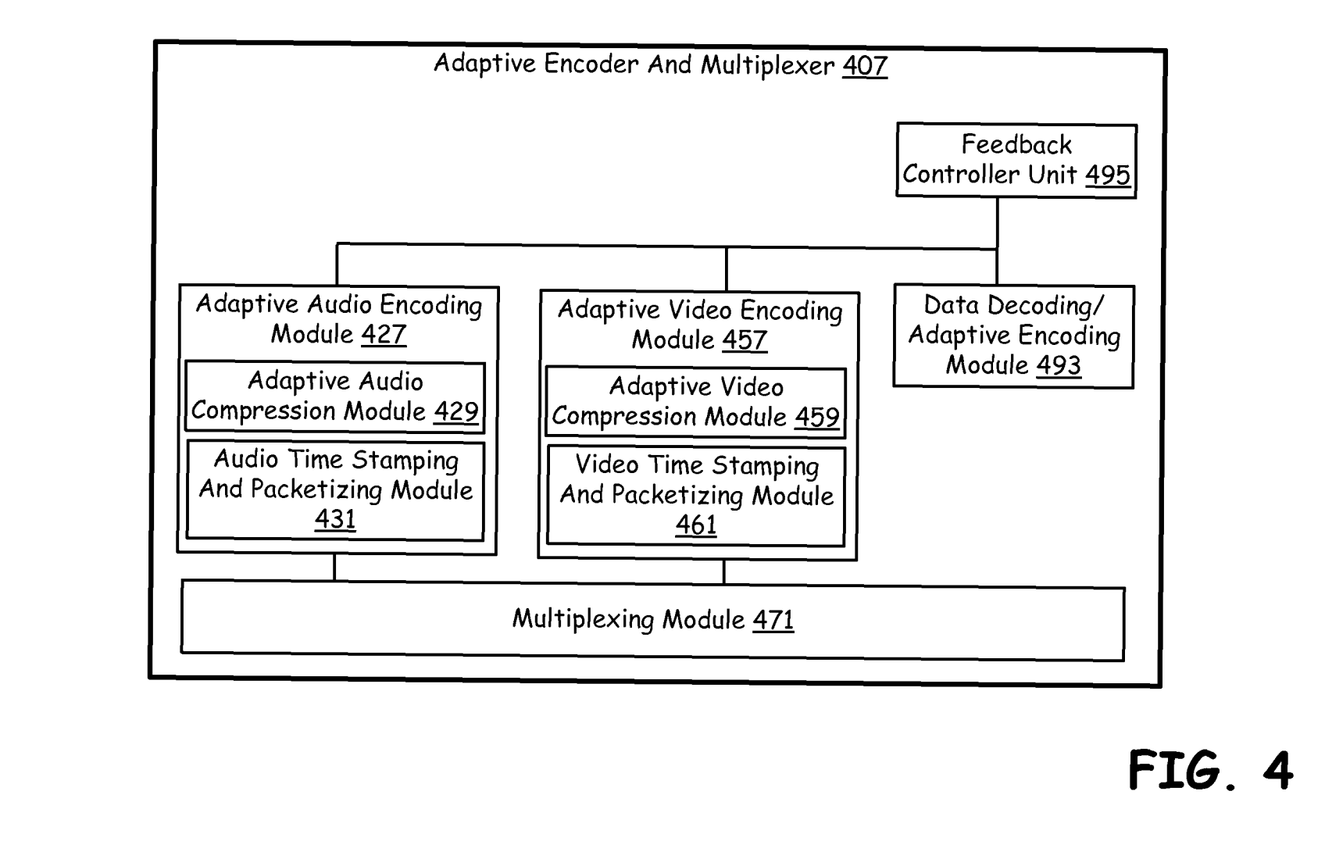
FIG. 4 is a schematic block diagram illustrating components of an adaptive encoder and multiplexer constructed in accordance with the embodiment of FIG. 2 of the present invention, wherein the adaptive encoder receives digital signals from an external source.

FIG. 4 is a schematic block diagram illustrating components of the adaptive encoder and multiplexer 407 constructed in accordance with the embodiment of FIG. 2 of the present invention, wherein the adaptive encoder receives digital signals from an external source. The adaptive encoder and multiplexer 407 may be incorporated into the Internet based digital program source (221 of FIG. 2) and contains a plurality of modules to adaptively and optimally encode digital audio, video and data signals received from an external (or a local program source).

An adaptive audio encoding module 427 contained in the adaptive encoder and multiplexer 407, in turn contains an adaptive audio compression module 429 and audio time stamping and packetizing module 431. The adaptive audio compression module 429 compresses the raw audio signal in an optimal and adaptive manner. The feedback control data for determining optimum and adaptive compression is obtained from a feedback control unit 495. Then, the audio time stamping and packetizing module 431 inserts IP protocols and time stamp on the incoming compressed audio stream to convert the compressed audio signals to IP audio program packets and delivers them to a multiplexing module 471.

Similarly, an adaptive video encoding module 457 contained in the adaptive encoder and multiplexer 407, in turn contains an adaptive video compression module 459 and video time stamping and packetizing module 461, respectively, which compress the raw video signal in an optimal and adaptive manner and then insert IP protocols and time stamp on the incoming compressed video stream to convert the compressed video signals to IP video program packets and deliver them to the multiplexing module 471. The feedback control data for determining optimum number of referencing and re-referencing frames within a frame set (that is, adaptive and optimal compression) is obtained from the feedback control unit 495, which in turn is received from the respective recipient video device.

The data decoding/adaptive encoding module 493 decodes and then adaptively encodes the data stream in an analogous fashion to that of audio and video decoding and adaptive encoding process, based upon feedback control data from the feedback control unit 495. In addition, if the adaptive encoder and multiplexer 407 receives a plurality of video programs to be encoded adaptively, packetized and multiplexed (such as a plurality television channels delivered simultaneously), then the multiplexing module 471 may have appropriate circuitry to multiplex the plurality of video programs, in addition to multiplexing audio, video and data IP program packets within each of these video programs.

Figure 5:
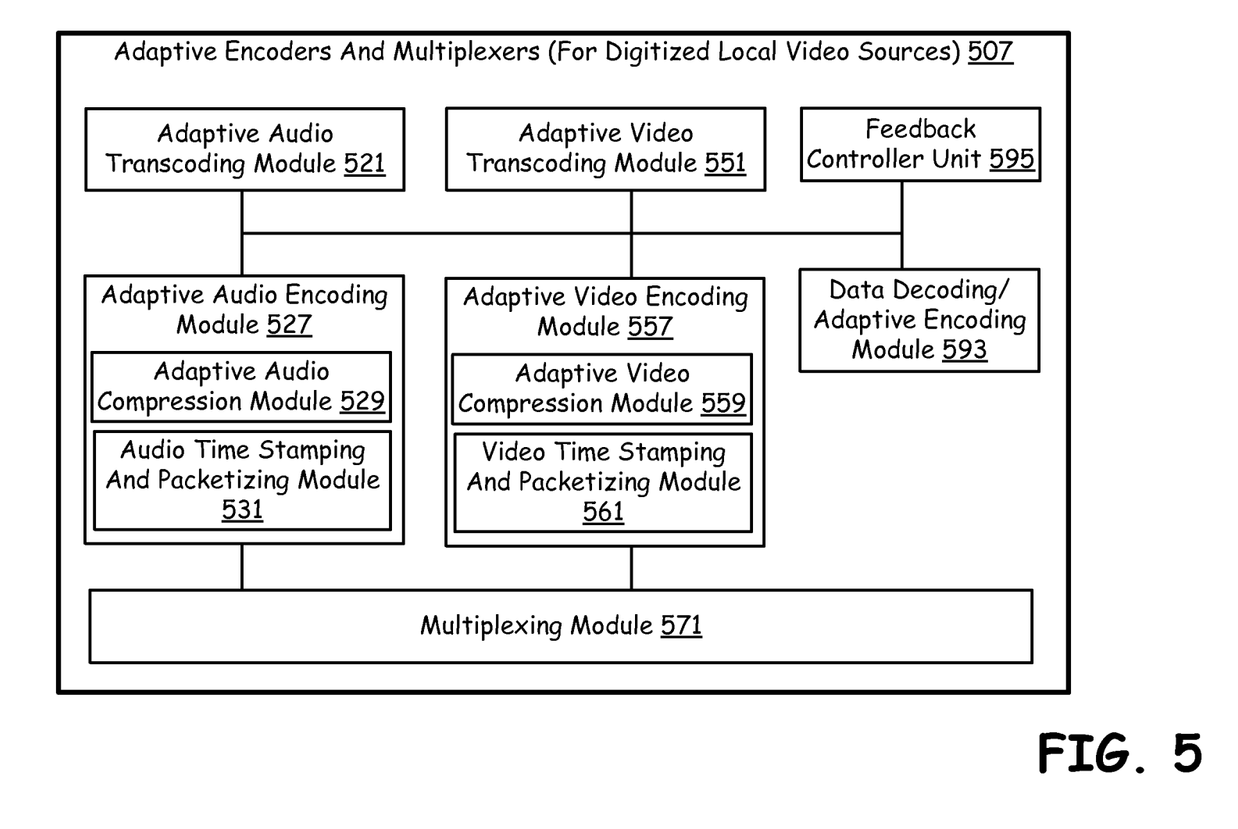
FIG. 5 is a schematic block diagram illustrating components of the adaptive encoder and multiplexer constructed in accordance with the embodiment of FIG. 2 of the present invention, wherein the adaptive encoder receives digital signals from a local video source.

FIG. 5 is a schematic block diagram illustrating components of the adaptive encoder and multiplexer 507 constructed in accordance with the embodiment of FIG. 2 of the present invention, wherein the adaptive encoder receives digital signals from a local digital video source. The adaptive encoder and multiplexer 407 is incorporated into the Internet based digital program source (221 of FIG. 2) and contains a plurality of modules to adaptively and optimally transcode and encode digital audio, video and data signals received from an external or the digital local program source.

An adaptive audio transcoding module 521 contained in the adaptive encoder and multiplexer 507 transcodes adaptively the raw audio signal obtained from a local program source. The feedback control data for determining optimum and adaptive transcoding is obtained from a feedback control unit 595. The parameters for optimum audio transcoding may include bandwidth required for a recipient device along with mono, stereo and surround sound capabilities.

An adaptive audio compression module 529 and audio time stamping and packetizing module 531 contained in an adaptive audio encoding module 527 compress the transcoded audio signal in an optimal and adaptive manner and then, inserts IP protocols and time stamps into the transcoded and compressed audio stream to convert to IP audio program packets and deliver them to a multiplexing module 571. The feedback control data for determining optimum and adaptive compression is obtained from a feedback control unit 595.

Similarly, an adaptive video transcoding module 551 contained in the adaptive encoder and multiplexer 507 transcodes adaptively the raw video signal obtained from a local digital program source, the feedback control data for which is obtained from the feedback control unit 595. The parameters for optimum video transcoding may include an aspect ratio of the recipient device along with processing and buffering capabilities. An adaptive video encoding module 557 contained in the adaptive encoder and multiplexer 507, in turn contains an adaptive video compression module 559 and video time stamping and packetizing module 561, respectively, which compress the transcoded video signal in an optimal and adaptive manner and then inserts IP protocol information and time stamps on the incoming transcoded and compressed video stream to convert to IP video program packets and deliver them to the multiplexing module 571. The feedback control data for determining an optimum number of referencing and re-referencing frames within a frame set (that is, adaptive and optimal compression) is obtained from the feedback control unit 595, which in turn is received from the respective recipient video device.

The data decoding/adaptive encoding module 593 decodes and then adaptively encodes the data stream in an analogous fashion to that of audio and video decoding and adaptive encoding process, based upon feedback control data from the feedback control unit 595. In addition, if the adaptive encoder and multiplexer 507 receives a plurality of video programs to be encoded adaptively, packetized and multiplexed (such as a plurality television channels delivered simultaneously), then the multiplexing module 571 may have appropriate circuitry to multiplex the plurality of video programs, in addition to multiplexing audio, video and data IP program packets within each of these video programs.

Figure 6:
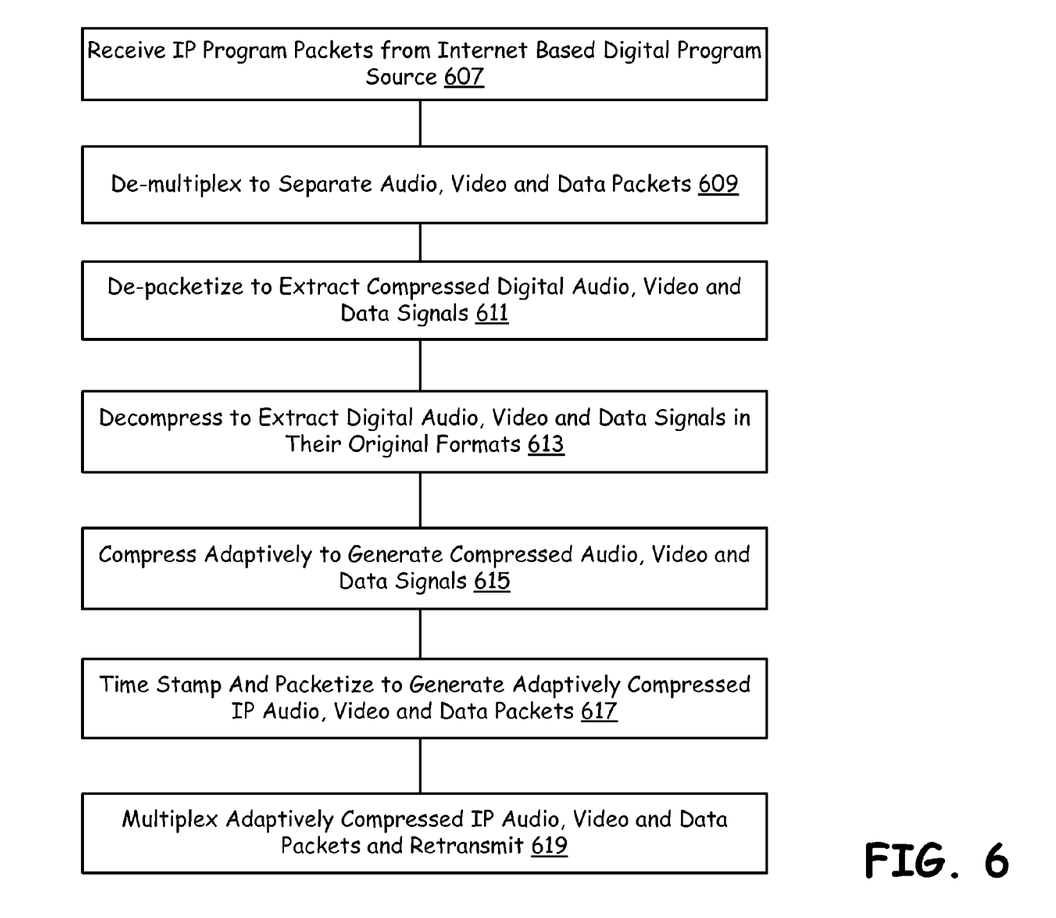
FIG. 6 is a flow diagram illustrating functionality of the frame adapter of FIG. 1, in general.

FIG. 6 is a flow diagram illustrating functionality of the frame adapter 129 of FIG. 1, in general. The functionality begins at a block 607, when the frame adapter receives IP program packets from an Internet based digital program source. The Internet based digital program source may be any of the Internet Service Provider's (ISP's) equipments (located centrally and delivered through ISPNs—Internet Service Provider's Network—and nearby APs—Access Points—, or located at a nearby ISP premises in an urban or rural location) and may either generate programs such as videos of movies, speeches, music programs, or may process and re-route programs originated by other program sources such as television studios. For example, many Internet based servers, including servers belonging to many ISPs, provide IPTV (Internet Protocol Tele-Vision) and Internet TV programs which are channeled through Internet backbone, ISPNs, Access Points, using broadband or other modes of program delivery. All of these programs use Internet protocol based packets to deliver compressed digital audio, video and data contents to the recipient devices, which will be converted back (by a Set Top Box—STB—, for example) to appropriate signals as applicable to a corresponding recipient device.

At a next block 609, the frame adapter de-multiplexes incoming IP program packets to separate audio, video and data packets. These separated data packets may still contain embedded Internet protocol information and any compression of program contents intact. Then, at a next block 611, the frame adapter de-packetizes the separated audio, video and data packets to remove Internet protocol information and extracts compressed digital audio, video and data contents. At a next block 613, the frame adapter decompresses the compressed digital audio, video and data contents to extract digital audio, video and data signals in their original formats.

Then, at a next block 615, the frame adapter compresses the digital audio, video and data signals in their original formats to generate adaptively compressed digital audio, video and data signals. The adaptive compression is based on compressing the program signals using various compression parameters such as number of reference and re-referencing frames, to optimally suit the buffering and processing capabilities of the recipient device. At a next block 617, the frame adapter inserts time stamps (to be able to sequentially re-assemble program packets at the recipient device) and packetizes (that is to insert Internet protocol information that includes the recipient device Internet address) the resulting signals. Then, at a final block 619, the frame adapter multiplexes adaptively compressed IP audio, video and data packets and then retransmits these IP program packets to the recipient device via Internet.

Figure 7:
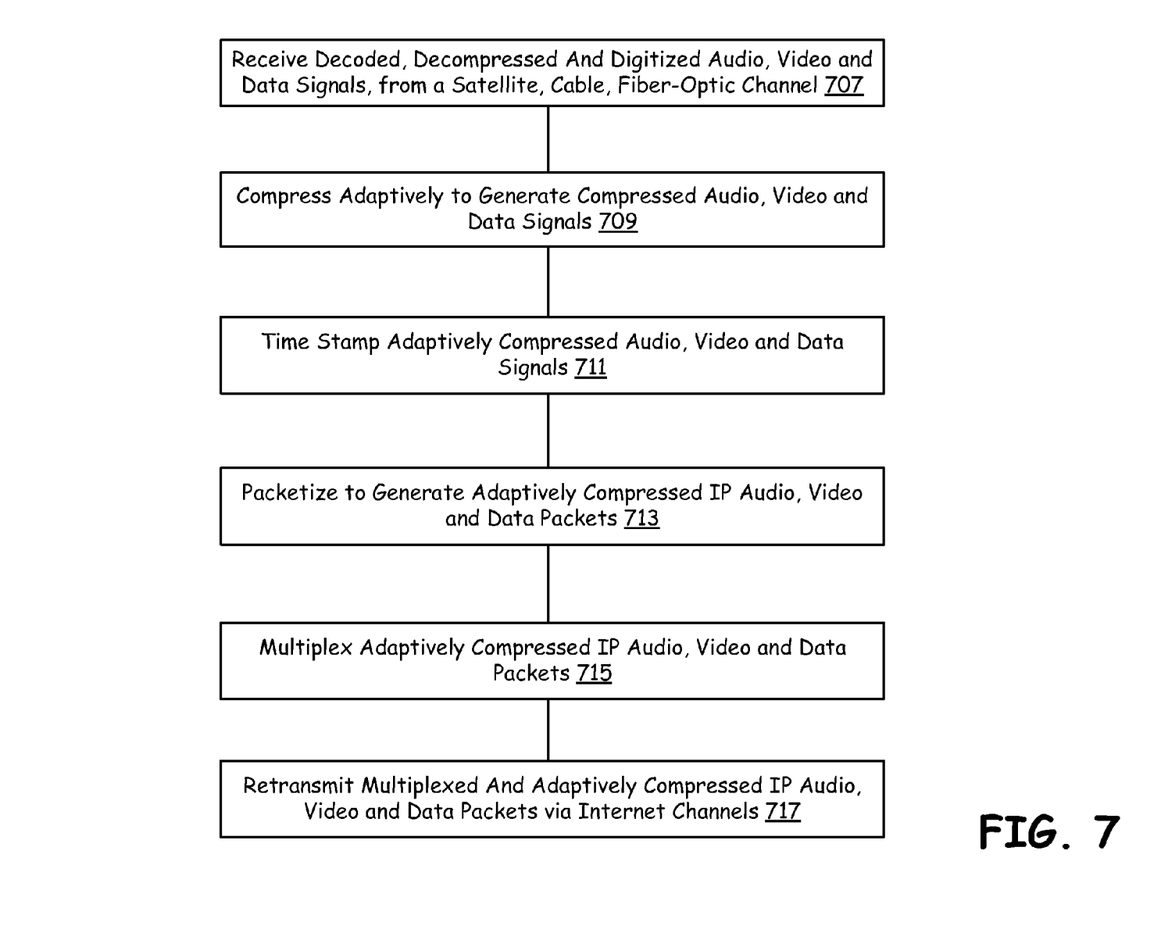
FIG. 7 is a flow diagram illustrating functionality of the adaptive encoder and multiplexer of FIG. 2, wherein the adaptive encoder receives digital signals from an external source.

FIG. 7 is a flow diagram illustrating functionality of the adaptive encoder and multiplexer of FIG. 2, wherein the adaptive encoder receives digital signals from an external source. The functionality begins at a block 707, when the adaptive encoder and multiplexer receives digitized, decoded and decompressed audio, video and data signals (via built-in internal decoders of an Internet based digital program source if necessary) from external sources via satellite, cable or fiber-optic channels.

Then, at a next block 709, the adaptive encoder and multiplexer adaptively compresses the digital audio, video and data signals to generate adaptively compressed digital audio, video and data signals. The adaptive compression is based upon compressing the program signals using various compression parameters such as number of reference and re-referencing frames, to optimally suit the buffering and processing capabilities of the recipient device. This information is received, via a feedback control unit built into the adaptive encoder and multiplexer, from the recipient device at the receiving end.

At a next block 711, the adaptive encoder and multiplexer inserts time stamps to enable the recipient device to sequentially re-assemble program packets. At a next block 713, the adaptive encoder and multiplexer packetizes the resulting time stamped audio, video and data signals, by inserting IP (Internet Protocol) information that includes the recipient device Internet address. Then, at a next block 715, the adaptive encoder and multiplexer multiplexes adaptively compressed IP audio, video and data packets. At a final block 717, the adaptive encoder and multiplexer retransmits these IP program packets to the recipient device via Internet.

Figure 8:
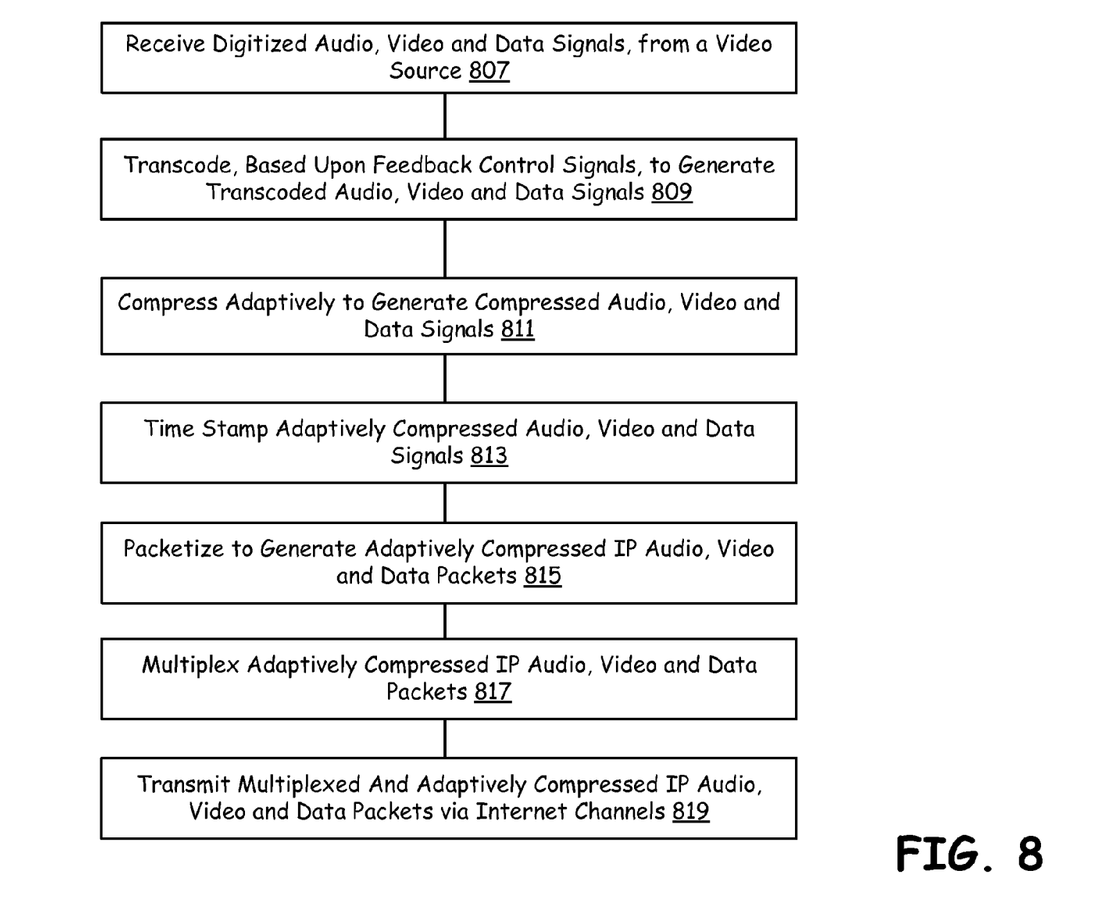
FIG. 8 is a flow diagram illustrating functionality of the adaptive encoder and multiplexer of FIG. 2, wherein the adaptive encoder receives digital signals from a local video source.

FIG. 8 is a flow diagram illustrating functionality of the adaptive encoder and multiplexer of FIG. 2, wherein the adaptive encoder receives digital signals from a local video source. The functionality begins at a block 807, when the adaptive encoder and multiplexer receives digital program signals directly from a local video source (or video program signals obtained, if necessary by de-multiplexing, de-packetizing and decompressing IP program packets, from satellite, cable or fiber-optic channels). The local video source may simply be decked set of programmable digital video players that play various videos at scheduled times or on demand.

Then at a next block 809, the adaptive encoder and multiplexer adaptively transcodes the digital audio, video and data signals to generate adaptively transcoded digital audio, video and data signals, based upon control signal parameters from a feedback control unit built into the adaptive encoder and multiplexer. The parameters for optimum audio, video and data signal transcoding, for a recipient device, may include: (a) Bandwidth required; (b) Mono, stereo and surround sound capabilities; (c) Screen aspect ratio; (d) Audio and video processing capabilities; and (e) Buffering capabilities.

Then, at a next block 811, the adaptive encoder and multiplexer adaptively compresses the digital audio, video and data signals to generate adaptively compressed digital audio, video and data signals, based upon feedback control parameters obtained from the corresponding recipient device (the parameters may include bandwidth required for mono, stereo and surround sound reproduction, screen aspect ratio, audio and video processing capabilities and buffering capabilities; and adaptive compression may involve varying number of reference and re-referencing frames for video signals).

At a next block 813, the adaptive encoder and multiplexer inserts time stamps to enable the recipient device to sequentially re-assemble program packets. At a next block 815, the adaptive encoder and multiplexer packetizes the resulting time stamped audio, video and data signals, by inserting IP (Internet Protocol) information that includes the recipient device Internet address. Then, at a next block 817, the adaptive encoder and multiplexer multiplexes adaptively compressed IP audio, video and data packets. At a final block 819, the adaptive encoder and multiplexer retransmits these IP program packets to the recipient device via Internet.

Figure 9:
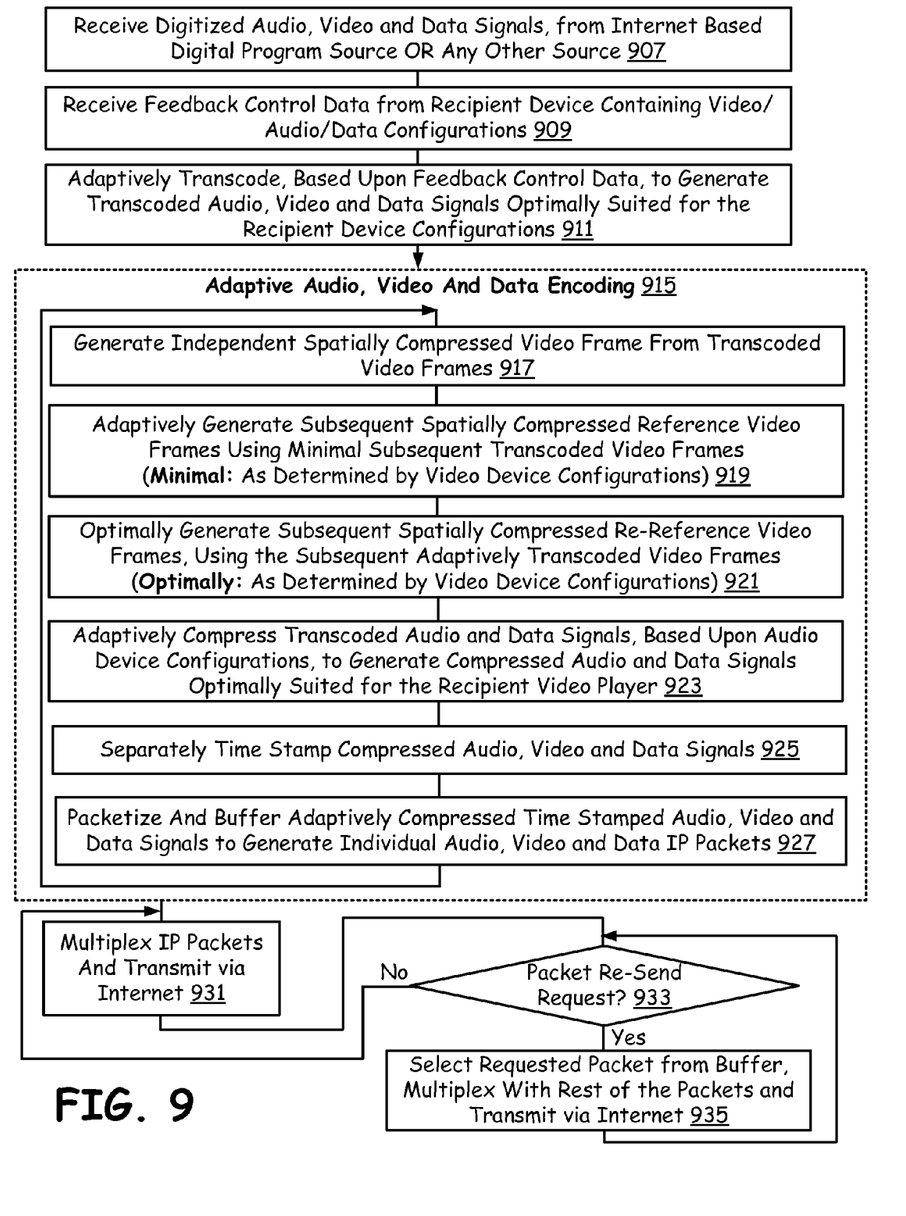
FIG. 9 is a flow diagram illustrating adaptive transcoding and/or adaptive encoding functionalities, partially or entirely employed by the frame adapter of FIG. 1 or adaptive encoder and multiplexer of FIG. 2, in detail, in accordance with the present invention.

FIG. 9 is a flow diagram illustrating adaptive transcoding and/or adaptive encoding functionalities, partially or entirely employed by the frame adapter of FIG. 1 or adaptive encoder and multiplexer of FIG. 2, in detail, in accordance with the present invention. Though the following functionality is entirely applicable to the adaptive encoder and multiplexer shown in FIG. 5, it is only partially applicable to the frame adapter of FIG. 3 and adaptive encoder and multiplexer of FIG. 4.

The functionality begins at a block 907, when the frame adapter or adaptive encoder and multiplexer receives digital program signals from an Internet based digital program source or any other source. At a next block 909, the frame adapter or adaptive encoder and multiplexer receives feedback control data from a recipient device containing audio, video and data configuration information, processing and buffering capability information. The entire configuration information may include: (a) Bandwidth required; (b) Mono, stereo and surround sound capabilities; (c) Screen aspect ratio; (d) Audio and video processing capabilities; and (e) Buffering capabilities. The feedback control data may also relate to a transmission path between the frame adapter or adaptive encoder and multiplexer and the recipient device, including bit error rate, data throughput/bandwidth rate, latency, and/or other characterization of the transmission path. Then, at a next block 911, the frame adapter or adaptive encoder and multiplexer adaptively transcodes the digital audio, video and data signals to generate optimally suited audio, video and data signals, based upon recipient device configuration information obtained via the feedback control unit built into the frame adapter or adaptive encoder and multiplexer.

At a next block 915, the frame adapter or adaptive encoder and multiplexer begins adaptive audio, video and data encoding, the flow of which are illustrated by 917, 919, 921, 923, 925 and 927. At the next block 917, the frame adapter or adaptive encoder and multiplexer generates an independent or base video frame which is already spatially compressed, from the transcoded video frames. At a next block 919, the frame adapter or adaptive encoder and multiplexer adaptively generates subsequent spatially compressed reference (predictive) video frames using minimal subsequent transcoded video frames. The optimum number of reference video frames to be generated, within a frame set, are determined by the recipient device's screen aspect ration, its video processing and buffering capabilities.

At a next block 921, the frame adapter or adaptive encoder and multiplexer adaptively generates subsequent spatially compressed re-reference (bidirectional predictive) video frames using minimal subsequent transcoded video frames. Typically, for recipient devices with nominal processing and buffering capabilities, no re-referencing frames may be generated at all. In general, the number of re-reference video frames to be generated, within a frame set, are again determined by the recipient device's screen aspect ration, its video processing and buffering capabilities.

At a next block 923, the frame adapter or adaptive encoder and multiplexer generates adaptively compressed audio signals from the transcoded audio signals, based upon audio configurations of the recipient device (which may include bandwidth required for mono, stereo or surround sound reproduction capabilities). Also, at the block 923, the frame adapter or adaptive encoder and multiplexer adaptively compresses data signals if necessary.

At a next block 925, the frame adapter or adaptive encoder and multiplexer inserts time stamps separately to compressed audio, video and data signals, to enable the recipient device to sequentially re-assemble program packets. At a next block 927, the frame adapter or adaptive encoder and multiplexer packetizes the resulting time stamped audio, video and data signals, by inserting IP (Internet Protocol) information that includes the recipient device Internet address, and in addition, buffers some of the latest audio, video and data packets for resending lost packets at a later time. The flow of blocks 917, 919, 921, 923, 925 and 927 continue until the transmission is stopped by the recipient device or the digital program ends.

Then, at a next block 931, the frame adapter or adaptive encoder and multiplexer multiplexes adaptively compressed IP audio, video and data packets generated by the processes of blocks 917, 919, 921, 923, 925 and 927 and transmits via Internet. At a next decision block 933, the frame adapter or adaptive encoder and multiplexer verifies if any re-send requests are placed by the recipient device. If yes, at a next block 935, the frame adapter or adaptive encoder and multiplexer selects requested IP program packet from the buffer and re-sends the IP video program packet. If not at the decision block 933, then at the block 931, the frame adapter or adaptive encoder and multiplexer continues to multiplex adaptively compressed IP audio, video and data packets and to transmit to recipient device via Internet.

Generally, the operations of FIG. 9 describe a method performed by an adaptive encoding module. This method includes compressing adaptively video data to generate adaptively compressed video, audio and data signals by receiving configuration data regarding a recipient device, generating spatially compressed independent video frames from the video data, and generating an optimal number of predicted video frames from the video data, the optimal number being determined based upon the configuration data. The operations of FIG. 9 further include packetizing the independent video frames and the predicted video frames into Internet Protocol (IP) packets and multiplexing the IP packets to generate IP program packets. The method further includes transmitting the IP program packets to the recipient device via a communication channel.

With the operations of FIG. 9, the video data may have a first ratio of base frames to predicted frame with the IP program packets having a second ratio of base frames to predicted frames that differs from the first ratio. With this aspect, the second ratio may include a greater relative number of base frames to predicted frames than does the first ratio. Further, with these operations, the configuration data may be further based upon a characterization of a transmission path between the method and the recipient device. Such characterization may include at least available throughput of the communication channel. The configuration data may indicate video processing capabilities of the recipient device and/or video presentation capabilities of the recipient device.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A digital electronic device incorporated at a front end of an Internet based digital program source that supports program transmission to a recipient device via a transmission path, the digital electronic device comprising:
   a digital program decoding module;
   an adaptive digital program encoding module;
   a feedback controller unit;
   the digital program decoding module decodes incoming Internet Protocol (IP) program packets and extracts digital audio and video data there from in a standard format;
   the feedback controller unit receives configuration data from the recipient device wherein the configuration data is based upon a transmission path characteristic and a recipient device characteristic;
   the adaptive digital program encoding module adaptively re-encodes the digital audio and video data based upon the configuration data to generate optimally suited Internet Protocol (IP) packets, adaptive re-encoding including generating an optimal number of predicted video frames from the digital video data, the optimal number being determined based upon the transmission path characteristic and the recipient device characteristic; and
   the digital electronic device delivers the optimally suited Internet protocol (IP) program packets to the recipient device via Internet the optimally suited IP program packets are formatted to optimally accommodate at least the transmission path characteristic and the recipient device characteristic.

2. The digital electronic device of claim 1, wherein the digital program decoding module further comprises an audio decoding module.

3. The digital electronic device of claim 2, wherein the audio decoding module de-packetizes and decompresses the audio signals of the Internet protocol (IP) program packets.

4. The digital electronic device of claim 1, wherein the digital program decoding modules further comprises a video decoding module.

5. The digital electronic device of claim 4, wherein the video decoding module de-packetizes and decompresses the video signals of the Internet protocol (IP) program packets.

6. The digital electronic device of claim 1, wherein the adaptive digital program encoding modules further comprises an adaptive audio encoding module.

7. The digital electronic device of claim 6, wherein the adaptive audio encoding module optimally compresses the audio signals to suit the recipient device configurations.

8. The digital electronic device of claim 7, wherein the adaptive audio encoding module packetizes the optimally compressed audio signals.

9. The digital electronic device of claim 1, wherein the adaptive digital program encoding modules further comprises an adaptive video encoding module.

10. The digital electronic device of claim 9, wherein the adaptive video encoding module optimally compresses the video signals to suit the recipient device configurations.

11. The digital electronic device of claim 10, wherein:
    the incoming IP program packets have with a first ratio of base frames to predicted frame; and
    the optimally suited IP program packets have a second ratio of base frames to predicted frames that differs from the first ratio.

12. The digital electronic device of claim 11, wherein the second ratio includes a greater relative number of base frames to predicted frames than does the first ratio.

13. The digital electronic device of claim 1, wherein the configuration data indicates video processing capabilities of the recipient device.

14. The digital electronic device of claim 1, wherein the configuration data indicates video presentation capabilities of the recipient device.

15. A method performed by an adaptive encoding module comprising:
    adaptively compressing video data to generate adaptively compressed video, audio and data signals by:
       receiving configuration data regarding a recipient device wherein the configuration data is based upon a characterization of a transmission path and a characteristic of the recipient device;
       generating spatially compressed independent video frames from the video data;
       adaptively generating an optimal number of predicted video frames from the video data, the optimal number being determined based upon the characterization of the transmission path and the characteristic of the recipient device;
       packetizing the independent video frames and the predicted video frames into Internet Protocol (IP) packets; and
    multiplexing the IP packets to generate IP program packets, wherein the IP program packets are optimally suited and formatted based upon the characterization of the transmission path and the characteristic of the recipient device; and
    transmitting the IP program packets to the recipient device via a communication channel Internet.

16. The method of claim 15, wherein:
    the video data has a first ratio of base frames to predicted frame; and
    the IP program packets have a second ratio of base frames to predicted frames that differs from the first ratio.

17. The method of claim 15, wherein the second ratio includes a greater relative number of base frames to predicted frames than does the first ratio.

18. The method of claim 15, wherein the configuration data indicates video processing capabilities of the recipient device.

19. The method of claim 15, wherein the configuration data indicates video presentation capabilities of the recipient device.

* * * * *

UNITED STATES PATENT AND TRADEMARK OFFICE
CERTIFICATE OF CORRECTION

PATENT NO.         : 8,793,749 B2                                    Page 1 of 1
APPLICATION NO.    : 12/197781
DATED              : July 29, 2014
INVENTOR(S)        : James D. Bennett It is certified that error appears in the above-identified patent and that said Letters Patent is hereby corrected as shown below:

In the Claims

Col. 15, line 44, in claim 1: after "via Internet" insert --,--
Col. 16, line 11, in claim 11: after "IP program packets have" delete "with"

Signed and Sealed this
Twelfth Day of May, 2015

Michelle K. Lee
*Director of the United States Patent and Trademark Office*